US008950535B2

(12) United States Patent
Harada et al.

(10) Patent No.: US 8,950,535 B2
(45) Date of Patent: Feb. 10, 2015

(54) WORK VEHICLE WITH A BRACKET SUPPORTING POST-TREATMENT APPARATUSES

(71) Applicant: Komatsu Ltd., Tokyo (JP)

(72) Inventors: Muneo Harada, Hitachinaka (JP); Naoto Ikeda, Komatsu (JP); Akihiko Sakamoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/117,173

(22) PCT Filed: Dec. 27, 2012

(86) PCT No.: PCT/JP2012/083765
§ 371 (c)(1),
(2) Date: Nov. 12, 2013

(87) PCT Pub. No.: WO2014/097495
PCT Pub. Date: Jun. 26, 2014

(65) Prior Publication Data
US 2014/0326527 A1 Nov. 6, 2014

(30) Foreign Application Priority Data
Dec. 20, 2012 (JP) ................................. 2012-278010

(51) Int. Cl.
B60K 11/04 (2006.01)
E02F 9/08 (2006.01)
(52) U.S. Cl.
CPC .................................... *E02F 9/0866* (2013.01)
USPC ........................... 180/68.4; 180/296; 180/299
(58) Field of Classification Search
CPC ....... B60K 11/04; B60K 13/04; E02F 9/0866; F01N 2590/08; F01N 3/2066
USPC ............... 180/309, 58, 291, 296, 299, 69.21, 180/69.22, 69.24, 69.4, 89.2, 311, 312, 180/68.4; 414/680
See application file for complete search history.

(56) References Cited

U.S. PATENT DOCUMENTS 3,910,041 A * 10/1975 Gibson ........................... 60/280
4,454,926 A * 6/1984 Akins ........................... 180/68.1
(Continued)

FOREIGN PATENT DOCUMENTS

| JP | 2011-529538 A | 12/2011 |
| JP | 2012-97413 A | 5/2012 |
| WO | 2011/152306 A1 | 12/2011 |

OTHER PUBLICATIONS

International Search Report for PCT/JP2012/083765, issued on Apr. 16, 2013.

*Primary Examiner* — Brodie Follman
(74) *Attorney, Agent, or Firm* — Global IP Counselors, LLP

(57) ABSTRACT

A work vehicle includes a vehicle frame, a radiator, an engine, a first post-treatment apparatus, a second post-treatment apparatus, and a bracket. The engine is provided in front of the radiator. The first post-treatment apparatus and the second post-treatment apparatus are positioned in front of the radiator and treat exhaust from the engine. The bracket is positioned in front of the radiator and is elastically supported by the vehicle frame. The bracket supports the engine, the first post-treatment apparatus, and the second post-treatment apparatus. Both the highest position of the first post-treatment apparatus and the highest position of the second post-treatment apparatus are no higher than the highest position of the radiator.

11 Claims, 9 Drawing Sheets

(56) References Cited

U.S. PATENT DOCUMENTS

| | | | |
|---|---|---|---|
| 4,506,749 A * | 3/1985 | Sieren | 180/69.2 |
| 5,538,097 A * | 7/1996 | Stauffer et al. | 180/69.21 |
| 5,564,514 A * | 10/1996 | Knight | 180/69.21 |
| 6,491,133 B2 * | 12/2002 | Yamada et al. | 181/200 |
| 6,880,656 B2 * | 4/2005 | Pfusterschmid et al. | 180/68.4 |
| 6,959,780 B2 * | 11/2005 | Oshima et al. | 180/299 |
| 7,036,622 B2 * | 5/2006 | Iwaki | 180/311 |
| 7,419,021 B2 * | 9/2008 | Morrow et al. | 180/65.22 |
| 7,520,364 B2 * | 4/2009 | Oka et al. | 180/291 |
| 7,966,979 B2 * | 6/2011 | Olsen et al. | 123/41.31 |
| 8,011,466 B2 * | 9/2011 | Honzek et al. | 180/68.4 |
| 8,167,067 B2 * | 5/2012 | Peterson et al. | 180/68.2 |
| 8,191,668 B2 * | 6/2012 | Keane et al. | 180/296 |
| 8,230,960 B2 * | 7/2012 | Shoen | 180/69.21 |
| 8,505,499 B2 * | 8/2013 | Hirasawa et al. | 123/41.31 |
| 8,511,711 B2 * | 8/2013 | Honzek | 280/785 |
| 8,573,646 B2 * | 11/2013 | Kamiya | 280/759 |
| 8,695,748 B2 * | 4/2014 | Togo et al. | 180/309 |
| 8,746,387 B2 * | 6/2014 | Ringer et al. | 180/89.2 |
| 8,800,704 B2 * | 8/2014 | Kitaoka et al. | 180/89.1 |
| 8,827,029 B1 * | 9/2014 | Nakagami et al. | 180/309 |
| 2003/0168269 A1 * | 9/2003 | Pfusterschmid et al. | 180/68.4 |
| 2010/0018732 A1 | 1/2010 | Daniel et al. | |
| 2010/0186381 A1 * | 7/2010 | Charles et al. | 60/282 |
| 2010/0186388 A1 * | 7/2010 | Olsen et al. | 60/295 |
| 2010/0186394 A1 * | 7/2010 | Harrison et al. | 60/299 |
| 2010/0187383 A1 * | 7/2010 | Olsen et al. | 248/201 |
| 2010/0269494 A1 * | 10/2010 | Saito et al. | 60/311 |
| 2010/0275588 A1 * | 11/2010 | Kamata et al. | 60/322 |
| 2011/0000637 A1 * | 1/2011 | Chang et al. | 165/41 |
| 2011/0005853 A1 * | 1/2011 | Kamiya | 180/296 |
| 2011/0011665 A1 * | 1/2011 | Peterson et al. | 180/309 |
| 2011/0030353 A1 * | 2/2011 | Kamiya et al. | 60/297 |
| 2011/0088637 A1 * | 4/2011 | Hirasawa et al. | 123/41.31 |
| 2012/0247861 A1 | 10/2012 | Mizuno et al. | |
| 2013/0145820 A1 * | 6/2013 | Boahene et al. | 73/23.31 |
| 2013/0213725 A1 * | 8/2013 | Togo et al. | 180/309 |
| 2013/0213726 A1 * | 8/2013 | Okada | 180/309 |
| 2013/0343853 A1 * | 12/2013 | Sato et al. | 414/719 |
| 2014/0056675 A1 * | 2/2014 | Kitaoka et al. | 414/685 |
| 2014/0182963 A1 * | 7/2014 | Sekiya | 180/309 |
| 2014/0190577 A1 * | 7/2014 | Yamamoto | 137/351 |
| 2014/0246262 A1 * | 9/2014 | Mori et al. | 180/309 |
| 2014/0262589 A1 * | 9/2014 | Sakamoto | 180/309 |
| 2014/0326527 A1 * | 11/2014 | Harada et al. | 180/309 |

* cited by examiner

WORK VEHICLE WITH A BRACKET SUPPORTING POST-TREATMENT APPARATUSES

CROSS-REFERENCE TO RELATED APPLICATIONS

This application is a U.S. National stage application of International Application No. PCT/JP2012/083765, filed on Dec. 27, 2012. This U.S. National stage application claims priority under 35 U.S.C. §119(a) to Japanese Patent Application No. 2012-278010, filed in Japan on Dec. 20, 2012, the entire contents of which are hereby incorporated herein by reference.

BACKGROUND

1. Filed of the Invention

The present invention relates to a work vehicle which is provided with a working implement.

2. Background Information

A post-treatment apparatus which treats exhaust from an engine is mounted in the work vehicle (refer to Japanese Laid-Open Patent Application Publication No. 2011-529538). The post-treatment apparatus is connected to the engine by a connecting pipe. It is preferable that the post-treatment apparatus include a diesel particulate filter (DPF) apparatus and a selective catalytic reduction (SCR) apparatus (refer to Japanese Laid-Open Patent Application Publication No. 2012-097413). The DPF apparatus reduces particulate matter in the exhaust. The SCR apparatus reduces nitrogen oxide (NOx) in the exhaust.

In Japanese Laid-Open Patent Application Publication No. 2011-529538, the post-treatment apparatus is arranged above the engine or a hydraulic pump. In Japanese Laid-Open Patent Application Publication No. 2012-097413, the post-treatment apparatus is arranged above the hydraulic pump. The post-treatment apparatus is supported on a table which is connected to a vehicle frame.

The work vehicle may perform excavation work using a ripper (refer to a ripper 51 in FIG. 1 and FIG. 2) which is provided in a rear section of the vehicle. At that time, the vehicle frame may be twisted. Accordingly, as in Japanese Laid-Open Patent Application Publication No. 2012-097413, in a case where the post-treatment apparatus is supported by a component connected to the vehicle frame, an excessive load is applied to the connecting pipe which links the post-treatment apparatus and the engine.

On the other hand, a method of mounting the post-treatment apparatus on top of the engine as in Japanese Laid-Open Patent Application Publication No. 2011-529538 may be effective in avoiding the above problem. With this method, the position of the post-treatment apparatus is installed at a higher position and an upper surface of an outer cover which covers the engine and the post-treatment apparatus is heightened. As a result, rear visibility becomes poor.

A work vehicle according to an aspect of the present invention comprises a vehicle frame, a radiator, an engine, a first post-treatment apparatus, a second post-treatment apparatus, and a bracket. The engine is provided in front of the radiator. The first post-treatment apparatus and the second post-treatment apparatus are positioned in front of the radiator and treat exhaust from the engine. The bracket is positioned in front of the radiator and is elastically supported by the vehicle frame. The bracket supports all of the engine, the first post-treatment apparatus, and the second post-treatment apparatus. Both the highest position of the first post-treatment apparatus and the highest position of the second post-treatment apparatus are as high as or lower than the highest position of the radiator.

At least one of the first post-treatment apparatus and the second post-treatment apparatus may be arranged in a position which does not overlap with the engine in top view.

The bracket may include a mounting bracket and a post-treatment apparatus support bracket. The mounting bracket supports the engine and may be elastically supported by the vehicle frame. The post-treatment apparatus support bracket supports the first post-treatment apparatus and the second post-treatment apparatus. The post-treatment apparatus support bracket may be supported by the mounting bracket at one edge of the mounting bracket. The mounting bracket may include a damper mounting section between the one edge which supports the post-treatment apparatus support bracket and the other edge.

The post-treatment apparatus support bracket may include an upper support section and a lower support section with different heights from a connecting position with the mounting bracket. The first post-treatment apparatus may be supported by the lower support section. The second post-treatment apparatus may be supported by the upper support section.

The second post-treatment apparatus may be arranged so as to overlap with a portion of the first post-treatment apparatus in top view.

The work vehicle may further comprise a connecting pipe. The connecting pipe is arranged above the first post-treatment apparatus and connects the first post-treatment apparatus and the second post-treatment apparatus. The second post-treatment apparatus may be arranged to be adjacent to the side of the connecting pipe.

The upper support section may be positioned at a closer position to the engine than the lower support section in top view. The first post-treatment apparatus may be a diesel particulate filter apparatus. The second post-treatment apparatus may be a selective catalytic reduction apparatus. Then, the first post-treatment apparatus may be arranged at a position which does not overlap with the engine in top view.

The work vehicle may further comprise an outer cover. The outer cover is arranged above the engine, the first post-treatment apparatus, the second post-treatment apparatus, and the radiator and is attached to the vehicle frame. The upper surface of the outer cover is set horizontally.

The vehicle frame may include a first support section which supports the bracket and a second support section which supports the radiator. The second support section may be lower than the first support section.

The post-treatment apparatus support bracket may further include an anti-sway component. The anti-sway component is connected to the engine and reduces vibration of the post-treatment apparatus support bracket in the vehicle front and back direction.

In the work vehicle according to an aspect of the present invention, the bracket supports both of the engine and the post-treatment apparatus support bracket. Then, the bracket is elastically supported by the vehicle frame. Accordingly, the engine, the first post-treatment apparatus, and the second post-treatment apparatus all vibrate with regard to the twist of the vehicle frame. As a result, a large load is not applied to the connecting pipe which links the post-treatment apparatus and the engine.

In addition, both the highest position of the first post-treatment apparatus and the highest position of the second post-treatment apparatus are as high as or lower than the highest position of the radiator. Accordingly, the upper surface of the outer cover is not heightened due to the post-treatment apparatuses. As a result, the rear visibility is improved.

DESCRIPTION OF THE EMBODIMENTS

Overall Configuration

Figure 1:
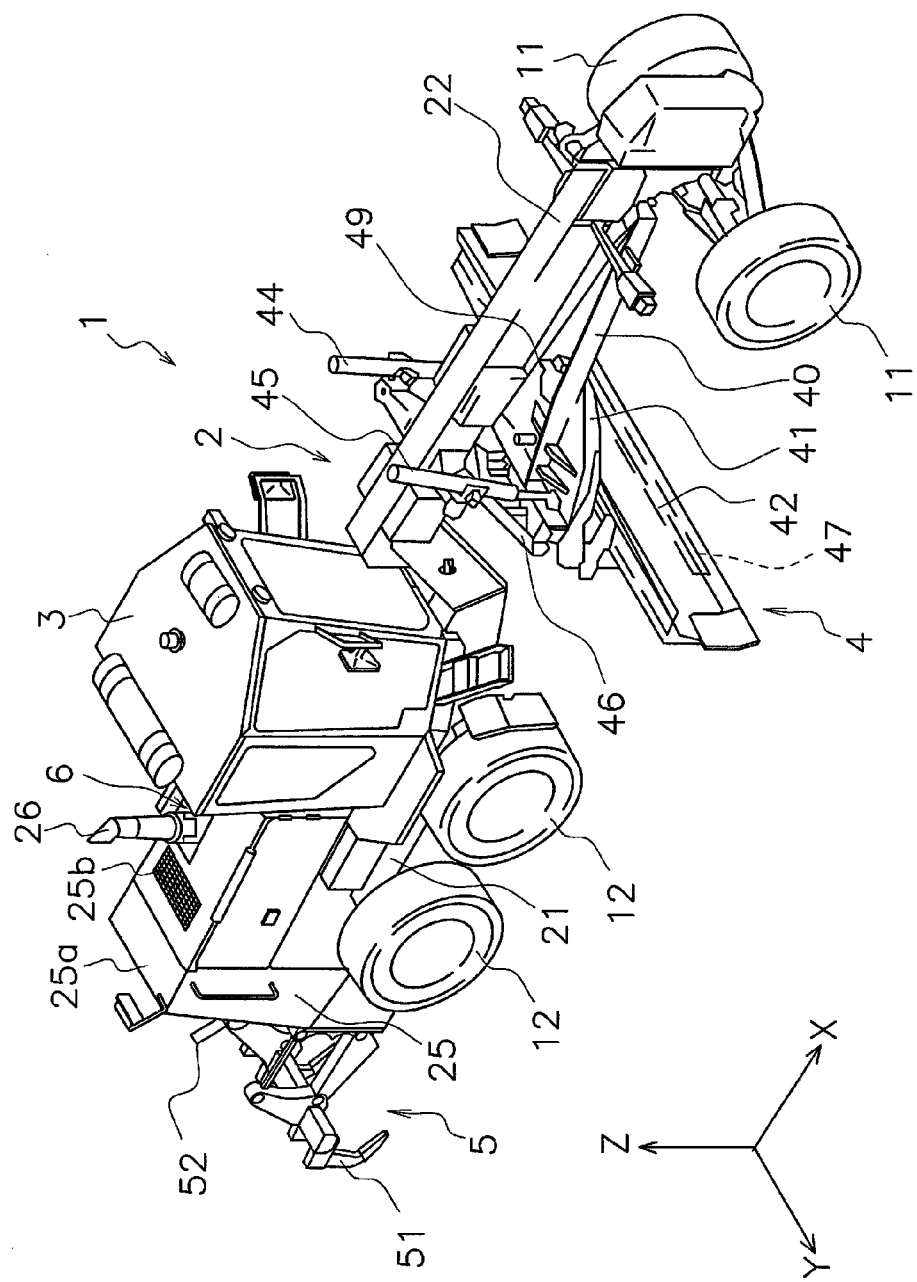
FIG. 1 illustrates a perspective view of an external appearance of a work vehicle.
Figure 2:
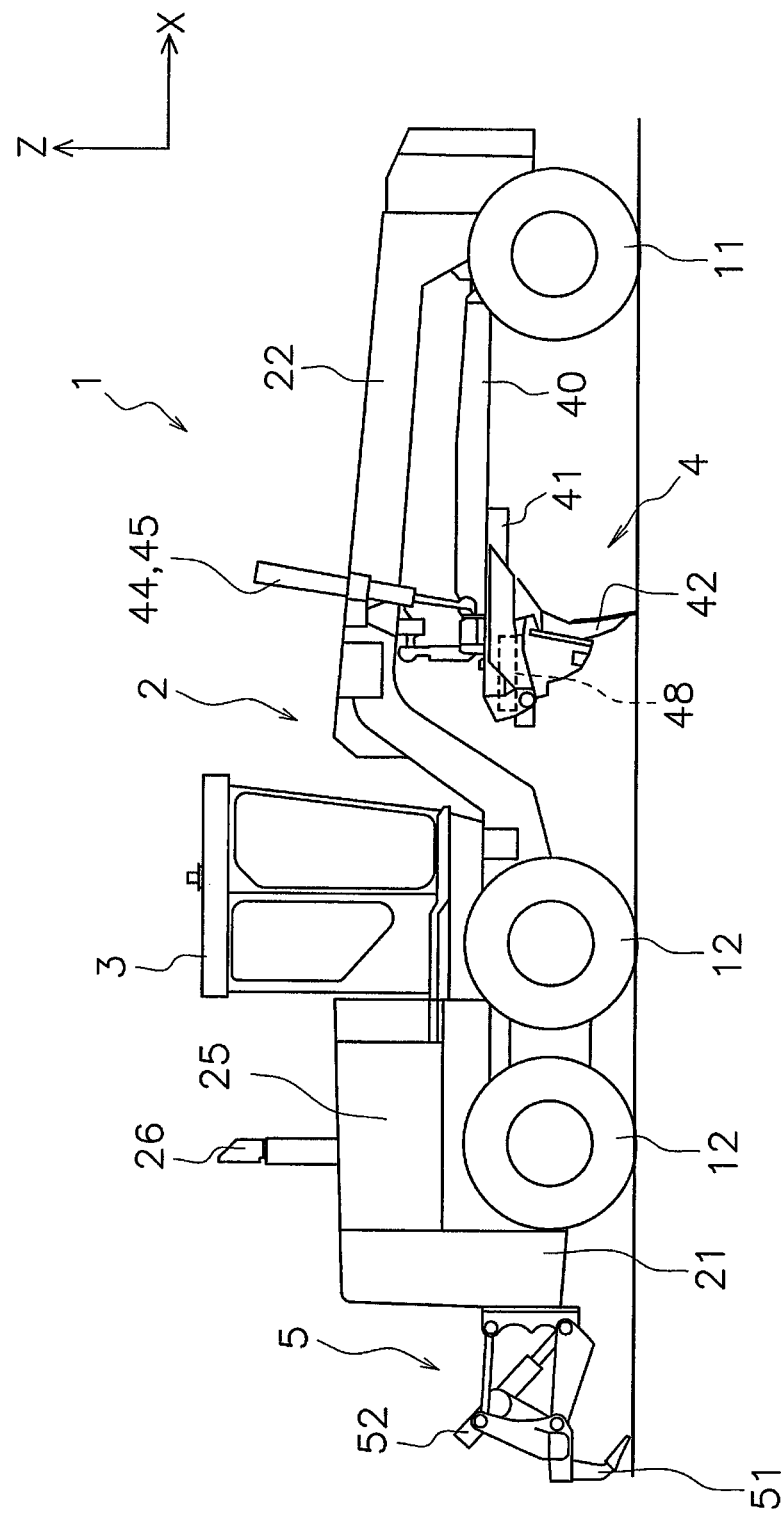
FIG. 2 illustrates a side view of a work vehicle.

FIG. 1 and FIG. 2 illustrate a perspective view and a side view of an external appearance of a work vehicle 1 according to an embodiment of the present invention. The work vehicle 1 is, for example, a motor grader. The work vehicle 1 is provided with driving wheels which include front wheels 11 and rear wheels 12. In FIG. 1 and FIG. 2, a case is illustrated where the work vehicle 1 is provided with a pair of two front wheels 11 to the left and right and four rear wheels 12 with two on each side, but the number and arrangement of the driving wheels is not limited to those in the above description. The work vehicle 1 can perform ground leveling work, snow removal work, light cutting, material mixing, and the like using a blade 42 provided between the front wheels 11 and the rear wheels 12. Here, in FIG. 1 and FIG. 2, out of the rear wheels 12, only the rear wheels positioned at the right side are illustrated. Here, in the following description, the front and back direction has the meaning of the front and back direction of the work vehicle 1. In other words, the front and back direction has the meaning of the front and back direction as seen by an operator who is seated in a cab 3. In addition, the left and right direction or the lateral direction has the meaning of the vehicle width direction of the work vehicle 1. In other words, the left and right direction, the vehicle width direction, or the lateral direction are the direction to the left and right as seen by the operator described above. In addition, in the diagrams, the front and back direction is shown as the X axis, the left and right direction is shown as the Y axis, and the vertical direction is shown as the Z axis.

As shown in FIGS. 1 and 2, the work vehicle 1 is provided with a vehicle frame 2, the cab 3, a working implement 4, and a rear working implement 5. In addition, the work vehicle 1 is also provided with components (refer to FIG. 3 and FIG. 5) arranged in an engine compartment 6.

Vehicle Frame 2 and Cab 3

The vehicle frame 2 comprises a rear section frame 21, a front section frame 22, and an outer cover 25 as shown in FIG. 1 and FIG. 2.

The rear section frame 21 supports the outer cover 25, the components arranged in the engine compartment 6 which will be described later, and the like. The outer cover 25 covers the engine compartment 6. In addition, the rear wheels 12 which will be described later are provided in the rear section frame 21. The vehicle moves due to the rotational drive of the rear wheels 12 caused by the driving force from an engine 61 (refer to FIG. 3 and FIG. 5).

The front section frame 22 is attached to the front of the rear section frame 21. The front wheels 11 are attached to the front end section of the front section frame 22.

The cab 3 is located on the rear section frame 21. A handle, a shift lever, an operating lever for the working implement 4, a brake, an accelerator pedal, an inching pedal, and the like (which are not shown in the diagram) are provided in an inner section of the cab 3. Here, the cab 3 may be located on the front section frame 22.

Working Implement 4

The working implement 4 includes a drawbar 40, a circle 41, the blade 42, a hydraulic motor 49, various types of hydraulic cylinders 44 to 48, and the like.

The front end section of the drawbar 40 is attached to the front end section of the front section frame 22 so as to be able to pivot. Due to the synchronized expansion and contraction of a pair of lift cylinders 44 and 45, the rear end section of the drawbar 40 is raised and lowered. In addition, the drawbar 40 swings up and down centering on an axis along the traveling direction of the vehicle due to the lift cylinders 44 and 45 expanding and contracting differently. Furthermore, the drawbar 40 moves to the left and right due to the expansion and contraction of a drawbar shift cylinder 46.

The circle 41 is attached to the rear end section of the drawbar 40 so as to be able to rotate. The circle 41 is driven by the hydraulic motor 49 (refer to FIG. 1). The circle 41 rotates in the clockwise or counterclockwise direction with regard to the drawbar 40 as seen from above the vehicle.

The blade 42 is supported so as to be able to slide in the left and right direction with regard to the circle 41 and to be able to swing up and down centering on a shaft parallel to the left and right direction. The blade 42 can move in the left and right direction with regard to the circle 41 using a blade shift cylinder 47. In addition, the blade 42 can change orientation in the up and down direction by swinging centering on a shaft parallel to the left and right direction with regard to the circle 41 using a tilt cylinder 48 (refer to FIG. 2) supported by the circle 41. The blade shift cylinder 47 and the tilt cylinder 48 are supported by the circle 41. As described above, the blade 42 can perform raising and lowering with regard to the vehicle, changing the inclination with regard to the traveling direction, changing the inclination with regard to the horizontal direction, rotating, and shifting in the left and right direction via the drawbar 40 and the circle 41.

The hydraulic motor 49 is driven to be able to rotate the circle 41 by hydraulic pressure supplied from a hydraulic pump (which is not shown in the diagram) which will be described later.

The hydraulic cylinders 44 to 48 are cylinders which are driven by hydraulic pressure supplied from the hydraulic pump. A pair of lift cylinders 44 and 45 is provided spaced apart to the left and right to interpose the front section frame 22. The lift cylinders 44 and 45 are substantially arranged along the vertical direction. The lift cylinders 44 and 45 are attached to the front section frame 22 and the drawbar 40. The lift cylinders 44 and 45 expand and contract to move the rear end section of the drawbar 40 up and down. In this way, the lift cylinders 44 and 45 can move the blade 42 in the up and down direction.

The drawbar shift cylinder 46 is arranged to be inclined with regard to the up and down direction. The drawbar shift cylinder 46 is attached to the side end section of the front section frame 22 and the drawbar 40. The drawbar shift cylinder 46 can expand and contract to change the position of the drawbar 40 with regard to the horizontal direction. In this way, the drawbar shift cylinder 46 can change the position of the blade 42.

The blade shift cylinder 47 is arranged along the longitudinal direction of the blade 42. The blade shift cylinder 47 is attached to the circle 41 and the blade 42. The blade shift cylinder 47 can expand and contract to change the position of the blade 42 in the longitudinal direction.

The tilt cylinder 48 is attached to the circle 41 and the blade 42. The tilt cylinder 48 can expand and contract to swing the blade 42 up and down centering on a shaft along the horizontal direction. In this way, the tilt cylinder 48 can change the angle of inclination of the blade 42 with regard to the traveling direction.

Rear Section Work Machine 5

The rear working implement 5 can be attached to or detached from the work vehicle 1. Accordingly, the work vehicle 1 need not include the rear working implement 5. The rear working implement 5 has the ripper 51, a lifting cylinder 52, and the like. The ripper 51 is used in excavation work. The ripper 51 is attached to the rear section frame 21 so as to be able to be lifted and lowered. The lifting cylinder 52 is a cylinder which is driven by hydraulic pressure supplied from the hydraulic pump. The lifting cylinder 52 can expand and contract to move the rear end section of the ripper 51 up and down. In this way, the lifting cylinder 52 can move the ripper 51 in the vertical direction.

Internal Configuration of Engine Compartment 6

Figure 3:
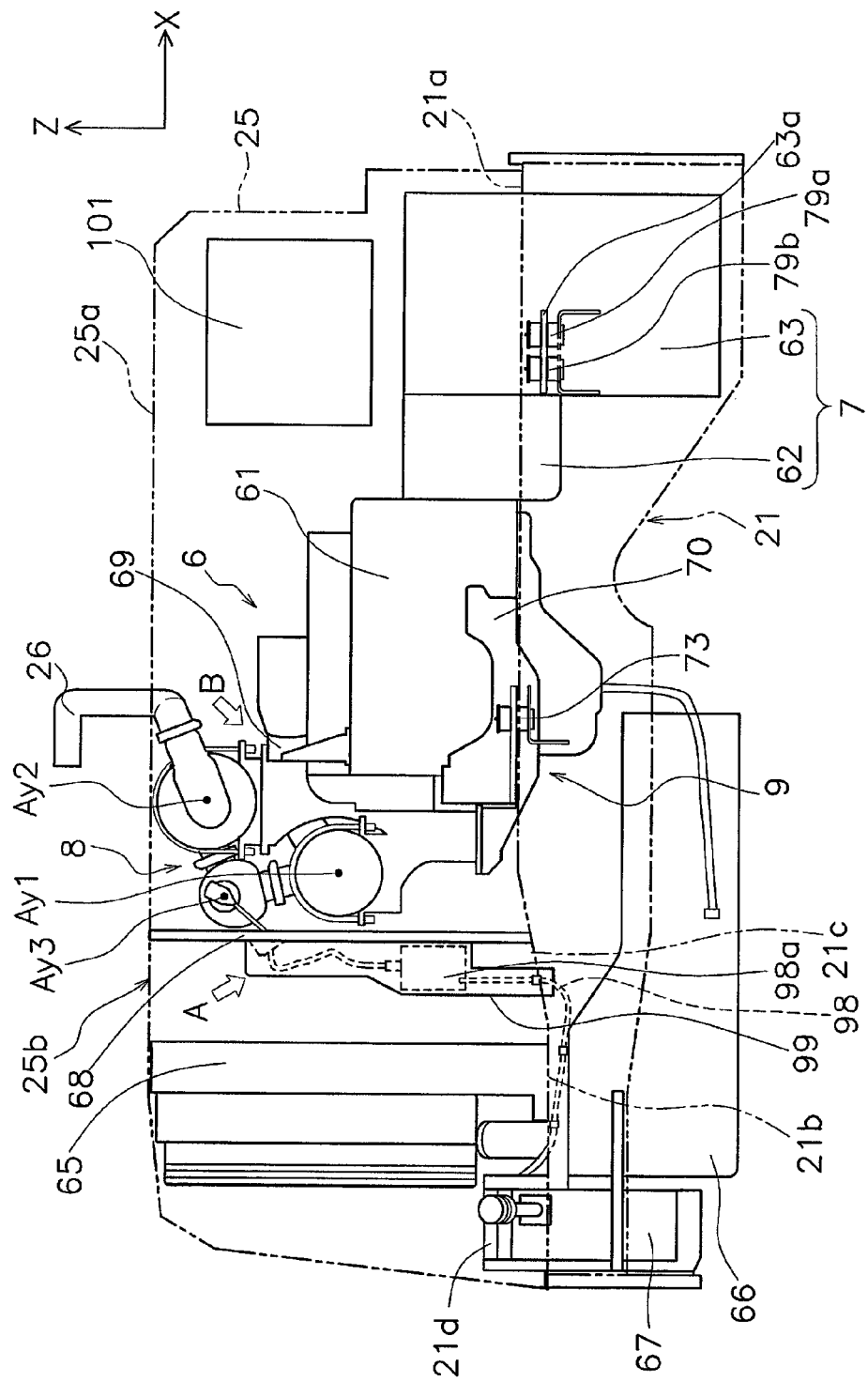
FIG. 3 illustrates a right side view of an internal configuration of an engine compartment.
Figure 4:
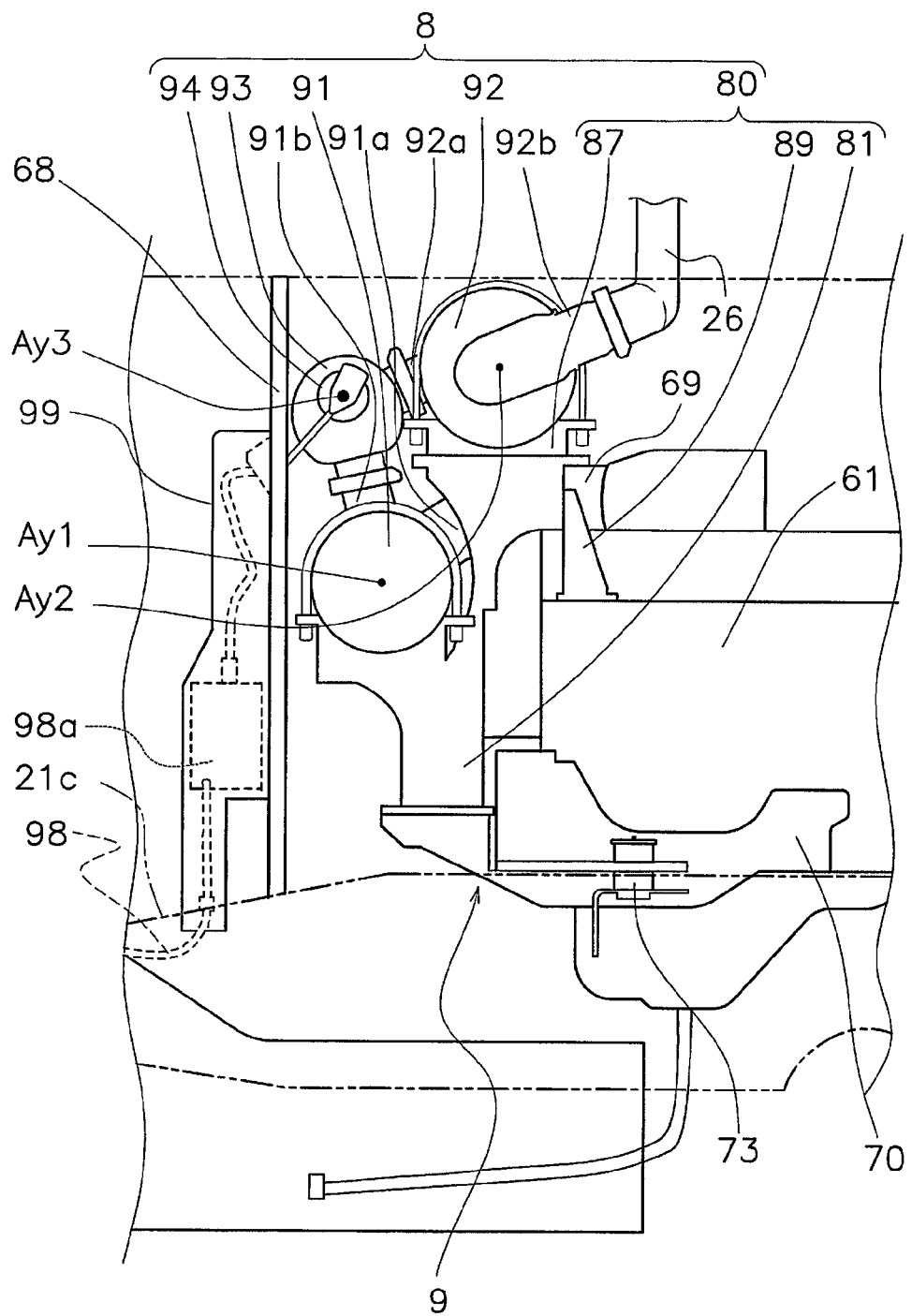
FIG. 4 illustrates an enlarged view of the vicinity of a post-treatment unit of FIG. 3.
Figure 5:
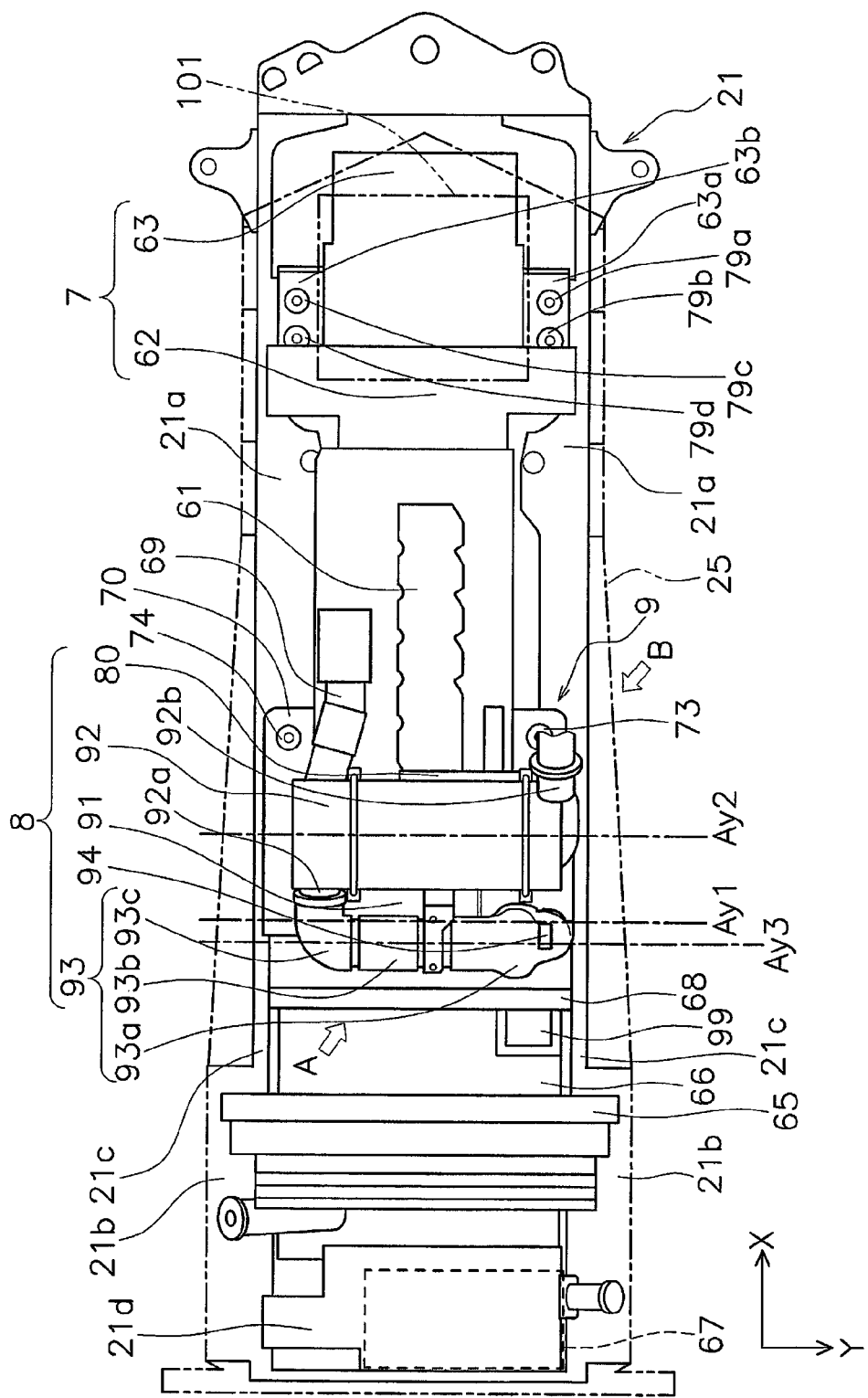
FIG. 5 illustrates a top view of an internal configuration of an engine compartment.

FIG. 3 illustrates a right side view of the internal configuration of an engine compartment. FIG. 4 illustrates an enlarged view of the vicinity of a post-treatment unit 8 (which will be described in detail later) of FIG. 3. FIG. 5 illustrates a top view of the internal configuration of the engine compartment. In FIG. 3, for convenience of description, the outlines of the rear section frame 21 and the outer cover 25 on the right side of the vehicle are shown by a two-dot chain line. In FIG. 5, the outlines of the outer cover 25 and a hydraulic oil tank 101 which will be described later are shown by a two-dot chain line and the outline of a reducing agent tank 67 which will be described later is shown by a dotted line. Here, in FIG. 3 to FIG. 5, covers 100a to 100c (refer to FIG. 6 and FIG. 7, described in detail later) are not shown for convenience of description.

As shown in FIG. 3 and FIG. 5, the engine 61, a power transmission apparatus 7, a radiator 65, the post-treatment unit 8, the hydraulic oil tank 101, and the like are arranged in the engine compartment 6. A fuel tank 66 and the reducing agent tank 67 are arranged below the engine compartment 6. In other words, the fuel tank 66 and the reducing agent tank 67 are arranged so as to protrude below the vehicle frame. The engine compartment 6 is covered by the outer cover 25.

As shown in FIG. 3, the rear section frame 21 includes a first support section 21a and a second support section 21b with different heights in the vertical direction, and a tapered section 21c. The first support section 21a is higher than the second support section 21b in the vertical direction. The tapered section 21c is positioned between the first support section 21a and the second support section 21b. Here, the first support section 21a, the second support section 21b, and the tapered section 21c are arranged to be substantially left and right symmetrical at both the left and right sides of the rear section frame 21.

The outer cover 25 is attached to the rear section frame 21. The outer cover 25 covers the engine compartment. That is, the outer cover 25 is arranged above the engine 61, a first post-treatment apparatus 91, a second post-treatment apparatus 92, and the radiator 65.

Fuel retained in the fuel tank 66 is supplied to the engine 61. The engine 61 generates driving force by burning the fuel and transmits the driving force to the torque converter 62 and the hydraulic pump. A bracket 9 is attached to the engine 61. In more detail, a mounting bracket 70 is attached to the engine 61. The mounting bracket 70 is attached to the rear section frame 21 through dampers 73 and 74 (refer to FIG. 5). In more detail, the mounting bracket 70 is attached to the first support section 21a through the dampers 73 and 74. Accordingly, the mounting bracket 70 supports the engine 61. That is, the bracket 9 supports the engine 61. In other words, the mounting bracket 70 (the bracket 9) and the engine 61 are elastically supported by the first support section 21a. That is, the mounting bracket 70 (the bracket 9) and the engine 61 are elastically supported by the rear section frame 21. The details of the bracket 9 and the mounting bracket 70 will be described later.

The power transmission apparatus 7 includes the torque converter 62 and a transmission 63. The torque converter 62 and the transmission 63 are arranged below the hydraulic oil tank 101. Flanges 63a and 63b (refer to FIG. 5) are attached to the transmission 63. The flange 63a is attached to the rear section frame 21 through dampers 79a and 79b. The flange 63b is attached to the rear section frame 21 through dampers 79c and 79d (refer to FIG. 5). In more detail, the flanges 63a and 63b are attached to the first support section 21a through the dampers 79a to 79d. In other words, the torque converter 62 and the transmission 63 are elastically supported by the first support section 21a. That is, the torque converter 62 and the transmission 63 are elastically supported by the rear section frame 21.

The torque converter 62 is connected to the output side of the engine 61. The transmission 63 is connected to the output side of the torque converter 62. The transmission 63 includes a hydraulic-type clutch, transmission gears, and the like (which are not shown in the diagram) inside the transmission 63. The transmission 63 converts the rotational speed and torque of its input shaft which is connected to the output side of the torque converter 62. The converted rotational speed and torque are eventually transmitted from an output shaft of the transmission 63 to the rear wheels 12 via a final reduction gear and tandem apparatus (which are not shown in the diagram). The vehicle moves due to the rotational driving of the rear wheels 12.

A hydraulic pump (which is not shown in the diagram) is provided to accompany the transmission 63. The hydraulic pump drives each type of clutch of the transmission 63, the hydraulic motor 49, and each type of cylinder 44 to 48 using the hydraulic pressure of hydraulic oil retained in the hydraulic oil tank 101.

The radiator 65 cools cooling water in the engine 61. Here, the radiator 65 is provided behind the engine 61 and the post-treatment unit 8 in the vehicle. In other words, the engine 61 and the post-treatment unit 8 are provided in front of the radiator 65 in the vehicle. The radiator 65 is supported by the second support section 21b. That is, the radiator 65 is supported by the rear section frame 21 at a position which is lower than a position which is supported by the mounting bracket 70. That is, the radiator 65 is supported by the rear section frame 21 at a position which is lower than the position where the bracket 9 is supported by the rear section frame 70.

Internal Configuration of Post-Processing Unit 8

Figure 6:
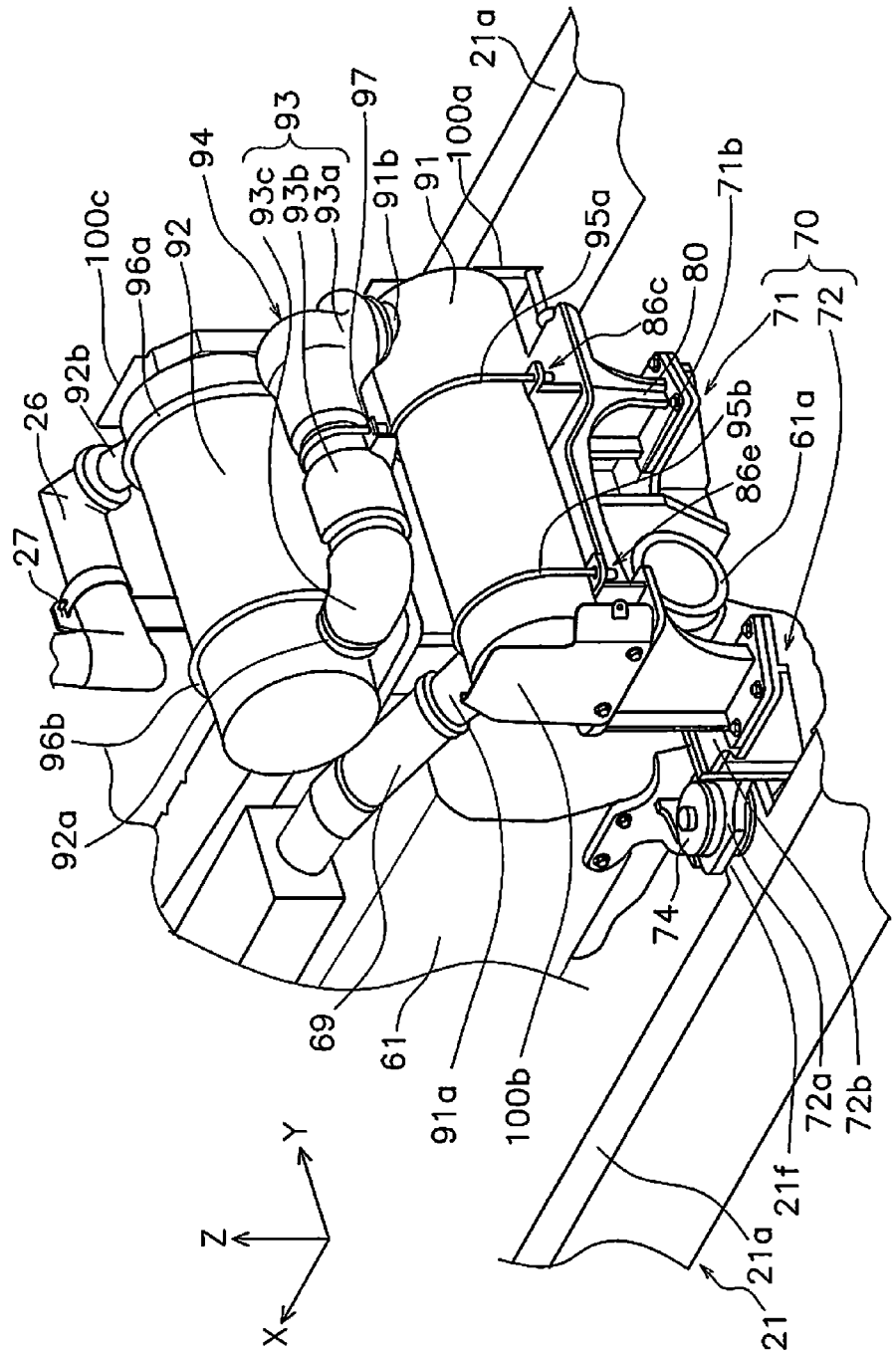
FIG. 6 illustrates a perspective view of the post-treatment unit which is seen from the A direction of FIG. 3 and FIG. 5.
Figure 7:
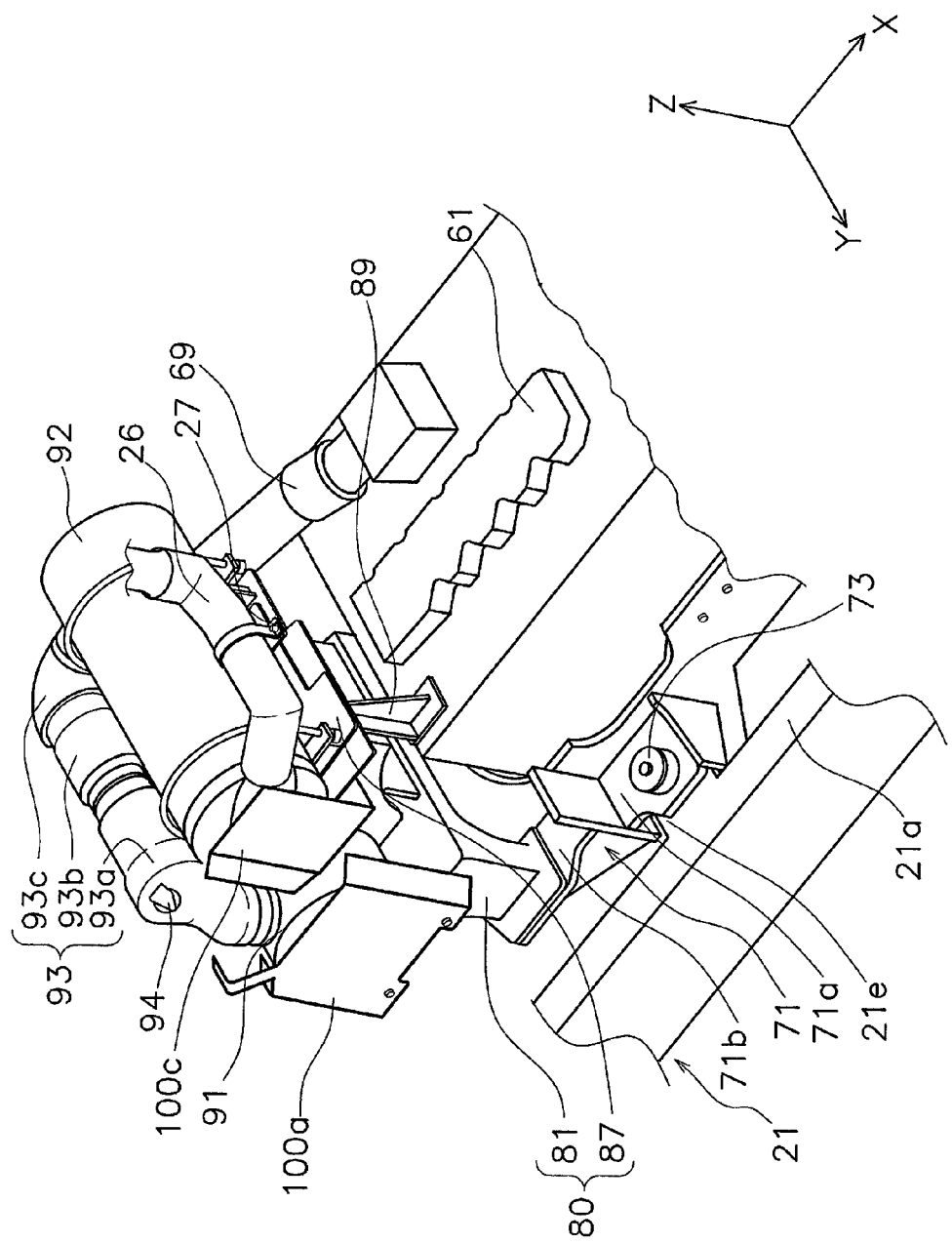
FIG. 7 illustrates a perspective view of the post-treatment unit which is seen from the B direction of FIG. 3 and FIG. 5.

Next, the details of the post-treatment unit 8 will be described. FIG. 6 illustrates a perspective view of the post-treatment unit 8 which is seen from the A direction of FIG. 3 and FIG. 5. FIG. 7 illustrates a perspective view of the post-treatment unit 8 which is seen from the B direction of FIG. 3 and FIG. 5. In FIG. 6 and FIG. 7, for convenience of description, the illustration of the shape of a portion of the engine 61, a partition wall 68, a protective cover 99 of a supply pipe 98 of the reducing agent, and a portion of the pipe is omitted.

As shown in FIG. 4, FIG. 6, and FIG. 7, the post-treatment unit 8 includes a post-treatment apparatus support bracket 80, the first post-treatment apparatus 91, the second post-treatment apparatus 92, and a second connecting pipe 93. In addition, the work vehicle 1 is further provided with a first connecting pipe 69, and an exhaust pipe 26. The first connecting pipe 69 is a pipe for feeding exhaust of the engine 61 to the post-treatment unit 8. The first connecting pipe 69 connects the engine 61 and the first post-treatment apparatus 91. The exhaust pipe 26 is a pipe for discharging exhaust, which is processed in the post-treatment unit 8, from the engine 61.

In the present embodiment, the first post-treatment apparatus 91 is, for example, a diesel particulate filter apparatus and treats the exhaust from the engine 61 which is fed via the first connecting pipe 69. The first post-treatment apparatus 91 captures particulate matter included in the exhaust using a filter. The first post-treatment apparatus 91 incinerates the captured particulate matter using a heater installed in the filter.

As shown in FIG. 5, the first post-treatment apparatus 91 is positioned in front of the radiator 65. As shown in FIG. 3 to FIG. 7, the first post-treatment apparatus 91 has a substantially cylindrical outline. As shown in FIG. 5, the first post-treatment apparatus 91 is arranged such that a center axis line Ay1 thereof is along the vehicle width direction.

As shown in FIG. 4 and FIG. 6, the first post-treatment apparatus 91 includes a first connection port 91a and a second connection port 91b. The first connecting pipe 69 is connected to the first connection port 91a. The second connecting pipe 93 is connected to the second connection port 91b.

The first connection port 91a protrudes obliquely upward. Specifically, the first connection port 91a protrudes obliquely upward and toward the engine 61 side. In contrast to this, the first connecting pipe 69 extends obliquely downward toward the first post-treatment apparatus 91 from a connecting position with the engine 61. As a result, the highest position of the first post-treatment apparatus 91 is lower than the highest position of the engine 61. In addition, the first post-treatment apparatus 91 is arranged at a position which does not overlap with the engine 61 in top view. That is, at least one of the first post-treatment apparatus 91 and the second post-treatment apparatus 92 is arranged at a position which does not overlap with the engine 61 in top view.

The second connection port 91b inclines slightly toward the rear from the vertical direction. As a result, as shown in FIG. 5, a center axis line Ay3 of a linear section 93b (which is described in detail later) of the second connecting pipe 93 is positioned slightly behind the center axis line Ay1 in top view.

The second connecting pipe 93 is a relay connecting pipe which connects the first post-treatment apparatus 91 and the second post-treatment apparatus 92. As shown in FIG. 4, the outer diameter of the second connecting pipe 93 is smaller than the outer diameter of the first post-treatment apparatus 91. One end of the second connecting pipe 93 is connected to the second connection port 91b of the first post-treatment apparatus 91. The other end of the second connecting pipe 93 is connected to a third connection port 92a of the second post-treatment apparatus 92. The second connecting pipe 93 is arranged in the vicinity of the first post-treatment apparatus 91 above the first post-treatment apparatus 91.

As shown in FIGS. 5 to 7, the second connecting pipe 93 includes a first curved portion 93a, the linear section 93b, and a second curved portion 93c. The linear section 93b is positioned above the first post-treatment apparatus 91. As shown in FIG. 5, the linear section 93b is arranged such that the center axis line Ay3 is along the vehicle width direction. That is, the linear section 93b is arranged such that the center axis line Ay3 is parallel to the center axis line Ay1 of the first post-treatment apparatus 91. The first curved portion 93a links the linear section 93b and the second connection port 91b. The second curved portion 93c links the linear section 93b and the third connection port 92a of the second post-treatment apparatus 92. A reducing agent ejection apparatus 94 is attached to the first curved portion 93a. The reducing agent ejection apparatus 94 ejects the reducing agent inside the second connecting pipe 93. The reducing agent is, for example, aqueous urea.

In the present embodiment, the second post-treatment apparatus 92 is, for example, a selective catalytic reduction apparatus. The second post-treatment apparatus 92 treats the exhaust, which is treated by the first post-treatment apparatus 91, from the engine 61. The second post-treatment apparatus 92 selectively reduces nitrogen oxide NOx.

The second post-treatment apparatus 92 has a substantially cylindrical outline. As shown in FIG. 5, the second post-treatment apparatus 92 is arranged such that a center axis line Ay2 thereof is along the vehicle width direction. In addition, the second post-treatment apparatus 92 is arranged such that the center axis line Ay2 is parallel to the center axis line Ay1 of the first post-treatment apparatus 91.

As shown in FIG. 5, the second post-treatment apparatus 92 is positioned in front of the radiator 65. In more detail, the second post-treatment apparatus 92 is arranged to be laterally adjacent to the second connecting pipe 93. In addition, as described above, the diameter of the second connecting pipe 93 is smaller than the diameter of the first post-treatment apparatus 91, and the center axis line Ay3 of the linear section 93b of the second connecting pipe 93 is positioned slightly behind the center axis line Ay1 in top view. As a result, the second post-treatment apparatus 92 is arranged to overlap with a portion of the first post-treatment apparatus 91 in top view. In addition, the second post-treatment apparatus 92 is arranged so as to overlap with a portion of the engine 61 in top view.

The second post-treatment apparatus 92 is arranged such that the highest position thereof is as high as or lower than the highest position of the radiator 65. FIG. 3 illustrates an example where the highest position of the second post-treatment apparatus 92 is as high as the highest position of the radiator 65. However, the highest position of the second post-treatment apparatus 92 may be lower than the highest position of the radiator 65. In addition, the highest position of the first post-treatment apparatus 91 is lower than the highest position of the second post-treatment apparatus 92. Accordingly, both the highest position of the first post-treatment apparatus 91 and the highest position of the second post-treatment apparatus 92 are as high as or lower than the highest position of the radiator 65. Accordingly, as shown in FIG. 3, an upper surface 25a of the outer cover 25 can be set horizontally. Therefore, it is possible to realize excellent rear visibility.

As shown in FIG. 3 to FIG. 7, the second post-treatment apparatus 92 includes the third connection port 92a and a fourth connection port 92b. The second connecting pipe 93 is connected to the third connection port 92a. The exhaust pipe 26 is connected to the fourth connection port 92b. That is, the exhaust pipe 26 is connected to the second post-treatment apparatus 92.

The third connection port 92a is inclined slightly downward from the horizontal direction toward the rear. Accordingly, as shown in FIG. 3, the center axis line Ay3 of the linear section 93b of the second connecting pipe 93 is positioned slightly below the center axis line Ay2 in the vertical direction.

The fourth connection port 92b protrudes obliquely upward. Specifically, the fourth connection port 92b protrudes upward and obliquely toward the engine 61 side. Due to this, the exhaust pipe 26 protrudes obliquely upward above the engine 61. As a result, the outer cover 25 can be lowered, as compared to a case in which the fourth connection port 92b protrudes exactly upward. Furthermore, it is possible to arrange an air cleaner which is not shown in the diagram between the exhaust pipe 26 and the engine 61. The upper section of the exhaust pipe 26 protrudes upward from the outer cover 25.

The engine 61, the first connecting pipe 69, the first post-treatment apparatus 91, the second connecting pipe 93, the second post-treatment apparatus 92, and the exhaust pipe 26 are connected in series in this order. Accordingly, the exhaust from the engine 61 passes through the first connecting pipe 69 and is fed to the first post-treatment apparatus 91. In the first post-treatment apparatus 91, the particulate matter is mostly reduced from the exhaust. Next, the exhaust passes through the second connecting pipe 93 and is fed to the second post-treatment apparatus 92. In the second post-treatment apparatus 92, the NOx is mostly reduced. Thereafter, the exhaust gas which has been cleaned passes through the exhaust pipe 26 and is discharged to the outside.

Support Member of Post-Treatment Unit 8

Next, the manner in which each of the components of the post-treatment unit 8 is supported will be described. Here, for convenience of description, the mounting bracket 70 and the post-treatment apparatus support bracket 80 are together referred to as the bracket 9. Accordingly, the bracket 9 includes the mounting bracket 70 and the post-treatment apparatus support bracket 80. As shown in FIG. 6, the mounting bracket 70 has a first mounting component 71 and a second mounting component 72.

As shown in FIG. 7, the first mounting component 71 is attached to the right side surface of the engine 61 by a bolt or the like. The first mounting component 71 includes a first damper mounting section 71a and a first unit mounting section 71b. The first unit mounting section 71b is provided at one end (the rear end) of the first mounting component 71. That is, the first unit mounting section 71b is provided at one end (the rear end) of the mounting bracket 70. The post-treatment unit 8 is attached to the first unit mounting section 71b. In more detail, the post-treatment apparatus support bracket 80 is fixed to the first unit mounting section 71b by a bolt or the like. The first damper mounting section 71a is provided between one end (the rear end) and the other end (the front end) of the first mounting component 71 which is provided with the first unit mounting section 71b. That is, the first damper mounting section 71a is provided between one end (the rear end) and the other end (the front end) of the mounting bracket 70 which is provided with the first unit mounting section 71b. The first support section 21a includes a first protruding section 21e which protrudes inside the vehicle, and the first damper mounting section 71a overlaps with the first protruding section 21e. A damper 73 is attached to the first damper mounting section 71a and the damper 73 is mounted on the first protruding section 21e.

As shown in FIG. 6, the second mounting component 72 is attached to the left side surface of the engine 61 by a bolt or the like. The second mounting component 72 includes a second damper mounting section 72a and a second unit mounting section 72b. The second unit mounting section 72b is provided at one end (the rear end) of the second mounting component 72. That is, the second unit mounting section 72b is provided at one end (the rear end) of the mounting bracket 70. The post-treatment unit 8 is attached to the second unit mounting section 72b. In more detail, the post-treatment apparatus support bracket 80 is fixed to the second unit mounting section 72b by a bolt or the like. The second damper mounting section 72a is provided between one end (the rear end) and the other end (the front end) of the second mounting component 72 which is provided with the second unit mounting section 72b. That is, the second damper mounting section 72a is provided between one end (the rear end) and the other end (the front end) of the mounting bracket 70 which is provided with the second unit mounting section 72b. The first support section 21a includes a second protruding section 21f which protrudes inside the vehicle, and the second damper mounting section 72a overlaps with the second protruding section 21f. The damper 74 is attached to the second damper mounting section 72a and the damper 74 is mounted on the second protruding section 21f.

Due to such a configuration, the post-treatment unit 8 can be attached to and detached from the mounting bracket 70 in the first unit mounting section 71b and the second unit mounting section 72b at one end (the rear end) of the mounting bracket 70. In other words, the post-treatment unit 8 is supported by the mounting bracket 70 at one end (the rear end) of the mounting bracket 70. In more detail, the post-treatment apparatus support bracket 80 is supported by the mounting bracket 70 at one end (the rear end) of the mounting bracket 70. In addition, the post-treatment unit 8 is elastically supported by the first support section 21a. That is, the post-treatment unit 8 is elastically supported by the rear section frame 21. Accordingly, the post-treatment unit 8 vibrates integrally with the engine 61.

In addition, as described above, the torque converter 62 and the transmission 63, the torque converter 62 and the engine 61, the engine 61 and the mounting bracket 70, the mounting bracket 70 and the post-treatment unit 8 are connected to each other, and the components of them are all connected to the rear section frame 21 via the dampers 79a to 79d, 73, and 74. Accordingly, the torque converter 62, transmission 63, the engine 61, and the post-treatment unit 8 vibrate integrally and are not easily affected by the vibration from the rear section frame 21.

Figure 8:
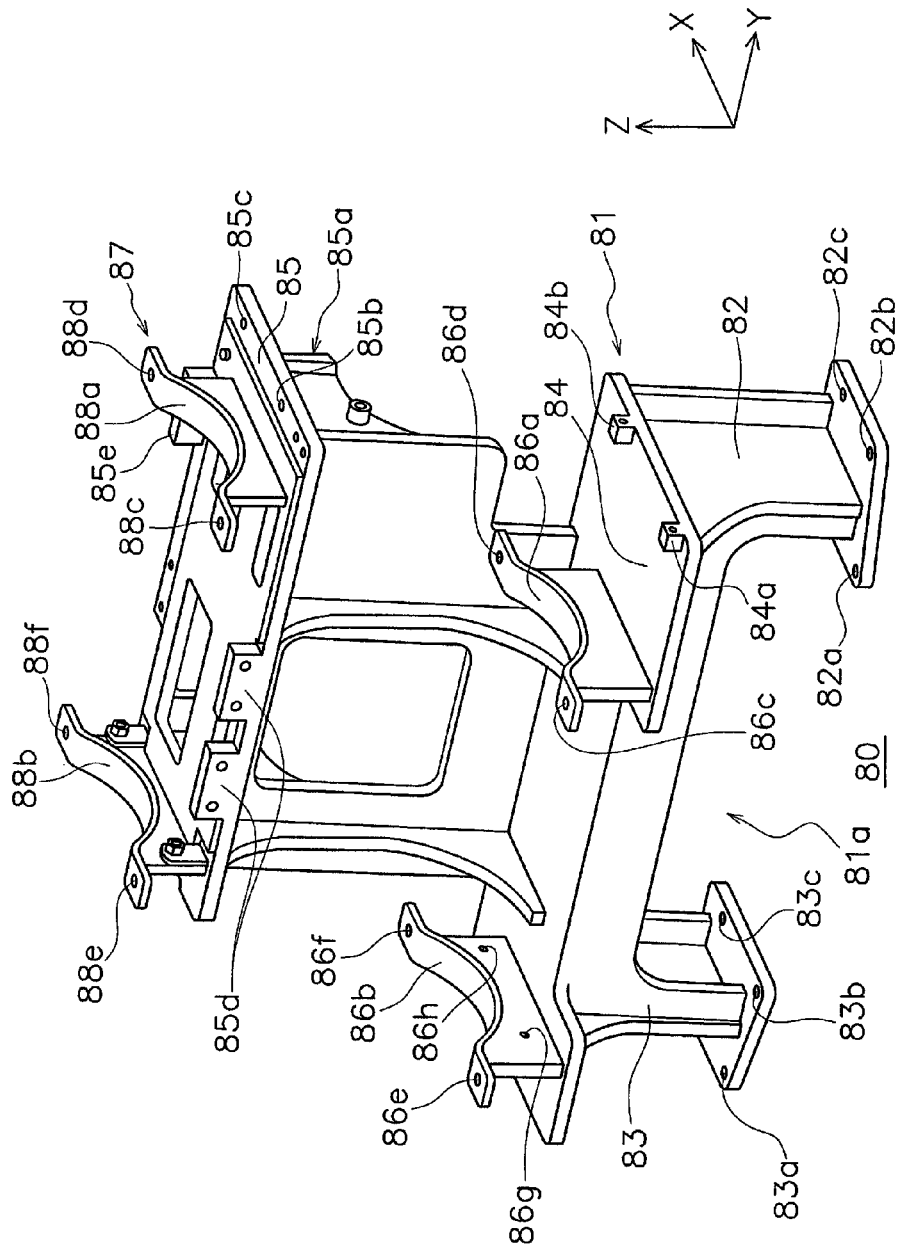
FIG. 8 illustrates a perspective view of a post-treatment apparatus support bracket.

FIG. 8 illustrates a perspective view of a post-treatment apparatus support bracket 80. The post-treatment apparatus support bracket 80 includes a lower member 81, an upper member 87, and an anti-sway component 89 (refer to FIG. 7). FIG. 8 illustrates only the lower member 81 and the upper member 87. The upper member 87 is detachably mounted on the lower member 81. The lower member 81 includes a right leg section 82, a left leg section 83, a lower step section 84, an upper step section 85, and lower support sections 86a and 86b. The upper member 87 includes upper support sections 88a and 88b. As shown in FIG. 5, the post-treatment apparatus support bracket 80 is positioned in front of the radiator 65.

The right leg section 82 includes first connecting sections 82a, 82b, and 82c for fixing to the first unit mounting section 71b. In the same manner, the left leg section 83 includes second connecting sections 83a, 83b, and 83c for fixing to the second unit mounting section 72b.

An opening section 81a is formed between the right leg section 82 and the left leg section 83 and below the lower step section 84. That is, the post-treatment apparatus support bracket 80 includes the opening section 81a. In the opening section 81*a*, it is possible to provide another power unit which is not shown in the diagram via a PTO (power take off) pump (which is not shown in the diagram) which is connected to a connecting pipe 61*a* (refer to FIG. 6) with the engine 61.

The upper step section 85 and the lower step section 84 have different heights from a connecting position with the mounting bracket 70 (the position of the first connecting sections 82*a* to 82*c* and the second connecting sections 83*a* to 83*c*). In more detail, the upper step section 85 is higher than the lower step section 84. The lower member 81 has a stepped shape which includes the upper step section 85 and the lower step section 84. In addition, as shown in FIG. 4 and the like, the lower member 81 is arranged such that the upper step section 85 is positioned at a closer position to the engine 61 than the lower step section 84 in top view.

Furthermore, the upper step section 85 includes a third connecting section 85*a* on the side surface of the engine 61 side. As shown in FIG. 4 and FIG. 7, the anti-sway component 89 is attached to the third connecting section 85*a*. The anti-sway component 89 is connected to the engine 61 and links the upper portion of the engine 61 and the upper step section 85. Since the post-treatment unit 8 has a heavy object at the upper section thereof, the upper portion of the post-treatment unit 8 can easily vibrate considerably, in particular in the front and back direction, due to the vibration of the mounting bracket 70. The anti-sway component 89 is fixed to the upper section of the engine 61, so that the anti-sway component 89 reduces vibration of the upper portion of the post-treatment unit 8 in the front and back direction.

Lower support sections 86*a* and 86*b* are provided over the lower step section 84. The lower support sections 86*a* and 86*b* support the first post-treatment apparatus 91. That is, the post-treatment apparatus support bracket 80 supports the first post-treatment apparatus 91. In other words, the bracket 9 supports the first post-treatment apparatus 91. The first post-treatment apparatus 91 has a substantially cylindrical outline, and the lower support section 86*a* and 86*b* have contact surfaces which correspond to the peripheral surface of the first post-treatment apparatus 91. In more detail, the lower support sections 86*a* and 86*b* have contact surfaces with a convex shape which expands in a downward direction.

The lower support sections 86*a* and 86*b* include fourth connecting sections 86*c*, 86*d*, 86*e*, and 86*f*. The fourth connecting sections 86*c* to 86*f* include holes which first fastening components 95*a* and 95*b* (refer to FIG. 6) which are fastened to the first post-treatment apparatus 91 pass through. As shown in FIG. 4 and FIG. 6, in the fourth connecting sections 86*c* to 86*f*, the first fastening components 95*a* and 95*b* are fastened with a nut to the back of the lower support sections 86*a* and 86*b* which is opposite to the side where the first post-treatment apparatus 91 is supported. In this manner, the first post-treatment apparatus 91 is fastened onto the lower support sections 86*a* and 86*b* by the first fastening components 95*a* and 95*b*.

When the upper member 87 is attached to the lower member 81, the upper support sections 88*a* and 88*b* are positioned over the upper step section 85. Accordingly, the upper support sections 88*a* and 88*b* and the lower support sections 86*a* and 86*b* have different heights from the connecting position with the mounting bracket 70 (the position of the first connecting sections 82*a* to 82*c* and the second connecting sections 83*a* to 83*c*). In more detail, the upper support sections 88*a* and 88*b* are higher than the lower support sections 86*a* and 86*b*. Furthermore, as shown in FIG. 4 and the like, the upper support sections 88*a* and 88*b* are positioned at a closer position to the engine 61 than the lower support sections 86*a* and 86*b* in top view.

The upper support section 88*a* and 88*b* support the second post-treatment apparatus 92. That is, the post-treatment apparatus support bracket 80 supports the second post-treatment apparatus 92. In other words, the bracket 9 supports the second post-treatment apparatus 92. The second post-treatment apparatus 92 has a substantially cylindrical outline, and the upper support sections 88*a* and 88*b* have contact surfaces which correspond to the peripheral surface of the second post-treatment apparatus 92. In more detail, the upper support sections 88*a* and 88*b* have contact surfaces with a convex shape which expand in a downward direction.

The upper support sections 88*a* and 88*b* include fifth connecting sections 88*c*, 88*d*, 88*e*, and 88*f*. The fifth connecting sections 88*c* to 88*f* include holes which second fastening components 96*a* and 96*b* (refer to FIG. 6) which are fastened to the second post-treatment apparatus 92 pass through. As shown in FIG. 4 or FIG. 6, in the fifth connecting sections 88*c* to 88*f*, the second fastening components 96*a* and 96*b* are fastened with a nut to the back of the upper support sections 88*a* and 88*b* which is opposite to the side where the second post-treatment apparatus 92 is supported. In this manner, the second post-treatment apparatus 92 is fastened onto the upper support sections 88*a* and 88*b* by the second fastening components 96*a* and 96*b*.

Here, the lower step section 84 may further have first cover connecting sections 84*a* and 84*b*. A first cover 100*a* (refer to FIG. 7) which covers the right side surface of the first post-treatment apparatus 91 is attached to the first cover connecting sections 84*a* and 84*b*.

The lower support section 86*b* may further have second cover connecting sections 86*g* and 86*h*. A second cover 100*b* (refer to FIG. 6) which covers the left side surface of the first post-treatment apparatus 91 is attached to the second cover connecting sections 86*g* and 86*h*.

The upper step section 85 may further have third cover connecting sections 85*b* and 85*c*. A third cover 100*c* (refer to FIG. 7) which covers the right side surface of the second post-treatment apparatus 92 is attached to the third cover connecting sections 85*b* and 85*c*.

In addition, the upper step section 85 may further have a sixth connecting section 85*d* and a seventh connecting section 85*e*. A third fastening component 97 (refer to FIG. 6) which is fastened to the second connecting pipe 93 is attached to the sixth connecting section 85*d*. A fourth fastening component 27 (refer to FIG. 6 and FIG. 7) which is fastened to the exhaust pipe 26 is attached to the seventh connecting section 85*e*.

Pipe of Reducing Agent

The reducing agent which is ejected by the reducing agent ejection apparatus 94 is retained in the reducing agent tank 67. As described above, the reducing agent is, for example, aqueous urea. As shown in FIG. 3 and FIG. 5, the reducing agent tank 67 is arranged behind the radiator 65, but it is not necessarily limited thereto. The reducing agent tank 67 may be arranged in any place which the heat from the engine 61 and the post-treatment apparatuses 91 and 92 is not easily transmitted to. As shown in FIG. 5, a top plate 21*d* is provided over the reducing agent tank 67. Due to this, hot air from the radiator 65 does not directly hit the reducing agent tank 67 to restrain the reducing agent from being heated.

As shown in FIG. 3 and FIG. 4, the reducing agent is fed from the reducing agent tank 67 to the reducing agent ejection apparatus 94 through the supply pipe 98 and a drawing pump 98*a*. In order to restrain the heat from the engine 61 and the post-treatment apparatuses 91 and 92 from being conducted to the supply pipe 98, the work vehicle 1 is provided with the partition wall 68 in the engine compartment 6. The partition wall 68 is arranged between the supply pipe 98 and the post-treatment unit 8. The partition wall 68 is supported by the radiator 65 via a support member which is not shown in the diagram.

In addition, the outer cover 25 includes an air inlet port 25b (refer to FIG. 1 and FIG. 3) for drawing in outside air between the radiator 65 and the partition wall 68 in top view. The work vehicle 1 is provided with the protective cover 99 which covers the supply pipe 98 and the drawing pump 98a in the engine compartment 6 in order that the supply pipe 98 is not greatly cooled by the outside air which is drawn in and the cold air from the radiator 65.

Advantageous Effects

The work vehicle 1 according to the present embodiment is provided with the following features.

In the work vehicle 1, the bracket 9 supports both of the engine 61 and the post-treatment apparatus support bracket 80. Then, the bracket 9 is elastically supported by the rear section frame 21 (the vehicle frame 2). Accordingly, the engine 61, the first post-treatment apparatus 91 and the second post-treatment apparatus 92 all vibrate with regard to the twist of the rear section frame 21 (the vehicle frame 2). As a result, a large load is not applied to the first connecting pipe 69 which links the first post-treatment apparatus 91 and the engine 61. As a result, it is not necessary to provide the first connecting pipe 69 with a member which absorbs vibration such as a bellows. Furthermore, it is possible to shorten the first connecting pipe 69.

In addition, both the highest position of the first post-treatment apparatus 91 and the highest position of the second post-treatment apparatus 92 are as high as or lower than the highest position of the radiator 65. Accordingly, the upper surface of the outer cover 25 is not heightened due to the post-treatment apparatuses 91 and 92. More specifically, it is possible to set the upper surface of the outer cover 25 horizontal. As a result, the rear visibility is improved.

At least one of the first post-treatment apparatus 91 and the second post-treatment apparatus 92 is arranged at a position which does not overlap with the engine 61 in top view. In more detail, the first post-treatment apparatus 91 is arranged at a position which does not overlap with the engine 61 in top view. As a result, compared to a case where both of the first post-treatment apparatus 91 and the second post-treatment apparatus 92 are arranged above the engine 61, it is possible to lower the highest position of the post-treatment apparatuses (the higher position among the highest position of the first post-treatment apparatus 91 and the highest position of the second post-treatment apparatus 92). Accordingly, it is possible to lower the upper surface of the outer cover 25. As a result, the rear visibility is further improved.

The mounting bracket 70 includes the damper mounting sections 71a and 72a between the one end where the post-treatment apparatus support bracket 80 is supported and the other end. Then, the dampers 73 and 74 are attached between the mounting bracket 70 and the rear section frame 21. As a result, the load of the post-treatment unit 8, which is a heavy object, is distributed to the front and back centered on the dampers 73 and 74. Furthermore, a large load is not applied to the first connecting pipe 69 which links the first post-treatment apparatus 91 and the engine 61 even if a twist is generated in the rear section frame 21 due to the ripper work or the like. As a result, it is not necessary to provide the first connecting pipe 69 with a member which absorbs vibration such as a bellows. Furthermore, it is possible to shorten the first connecting pipe 69.

The post-treatment apparatus support bracket 80 has the upper support sections 88a and 88b and the lower support sections 86a and 86b whose heights are different from the connecting positions 82a to 82c and 83a to 83c to the mounting bracket 70. Then, the first post-treatment apparatus 91 is supported by the lower support sections 86a and 86b and the second post-treatment apparatus 92 is supported by the upper support sections 88a and 88b. Accordingly, since the first post-treatment apparatus 91 and the second post-treatment apparatus 92 are arranged at different heights, it is possible to shorten the length of the post-treatment unit 8 in the front and back direction. As a result, it is possible to shorten the length of the rear section frame 21 (that is, the vehicle frame 2) in the front and back direction. Therefore, it is possible to suppress the enlargement of the work vehicle 1.

The second post-treatment apparatus 92 is arranged to overlap with a portion of the first post-treatment apparatus 91 in top view. In addition, the second post-treatment apparatus 92 is arranged to be adjacent to the side of the second connecting pipe 93. Accordingly, it is possible to shorten the length of the lower member 81 (that is, the post-treatment apparatus support bracket 80) in the front and back direction. That is, it is possible to further shorten the length of the post-treatment unit 8 in the front and back direction. As a result, it is possible to further shorten the length of the rear section frame 21 (that is, the vehicle frame 2) in the front and back direction.

The upper support sections 88a and 88b are positioned at closer positions to the engine 61 than the lower support sections 86a and 86b in top view. Accordingly, it is possible to arrange the engine 61 below the upper support sections 88a and 88b to further shorten the length of the rear section frame 21 (that is, the vehicle frame 2) in the front and back direction.

The exhaust pipe 26 protrudes obliquely upward above the engine 61. Due to this, since it is possible to provide a space between the engine 61 and the exhaust pipe 26, it is possible to arrange an air cleaner in the space. In addition, it is possible to lower the outer cover 25 compared to a case where the exhaust pipe 26 protrudes vertically upward.

The rear section frame 21 (that is, the vehicle frame 2) includes the first support section 21a which supports the mounting bracket 70 and the second support section 21b which supports the radiator 65. Then, the second support section 21b is lower than the first support section 21a. Since the second support section 21b is lower than the first support section 21a, it is possible to lower the upper surface of the outer cover 25 even when the radiator 65, which is large with a high cooling capacity, is mounted in order to mount the post-treatment unit 8 on the work vehicle 1. As a result, the rear visibility is further improved.

The post-treatment apparatus support bracket 80 further includes the anti-sway component 89 which is connected to the engine 61. By the anti-sway component 89, the upper portion of the post-treatment apparatus support bracket 80 is fixed to the engine 61. As such, the vibration of the post-treatment apparatus support bracket 80 in the front and back direction of the vehicle is reduced.

The post-treatment apparatus support bracket 80 includes the opening section 81a. Accordingly, it is possible to provide another power unit via the PTO (power take off) pump in the opening section 81a.

MODIFIED EXAMPLES

Above, an embodiment of the present invention has been described but the present invention is not limited to the embodiments described above and various modifications are possible in a scope which does not depart from the gist of the invention.

In the embodiment described above, an example where the transmission 63, the torque converter 62, the engine 61, the post-treatment unit 8, the radiator 65, and the reducing agent tank 67 are arranged in the engine compartment 6 from the front of the vehicle to the rear in order has been described. However, this order is arbitrary except for the arrangement of the engine 61 and of the post-treatment unit 8 in front of the radiator 65.

Figure 9:
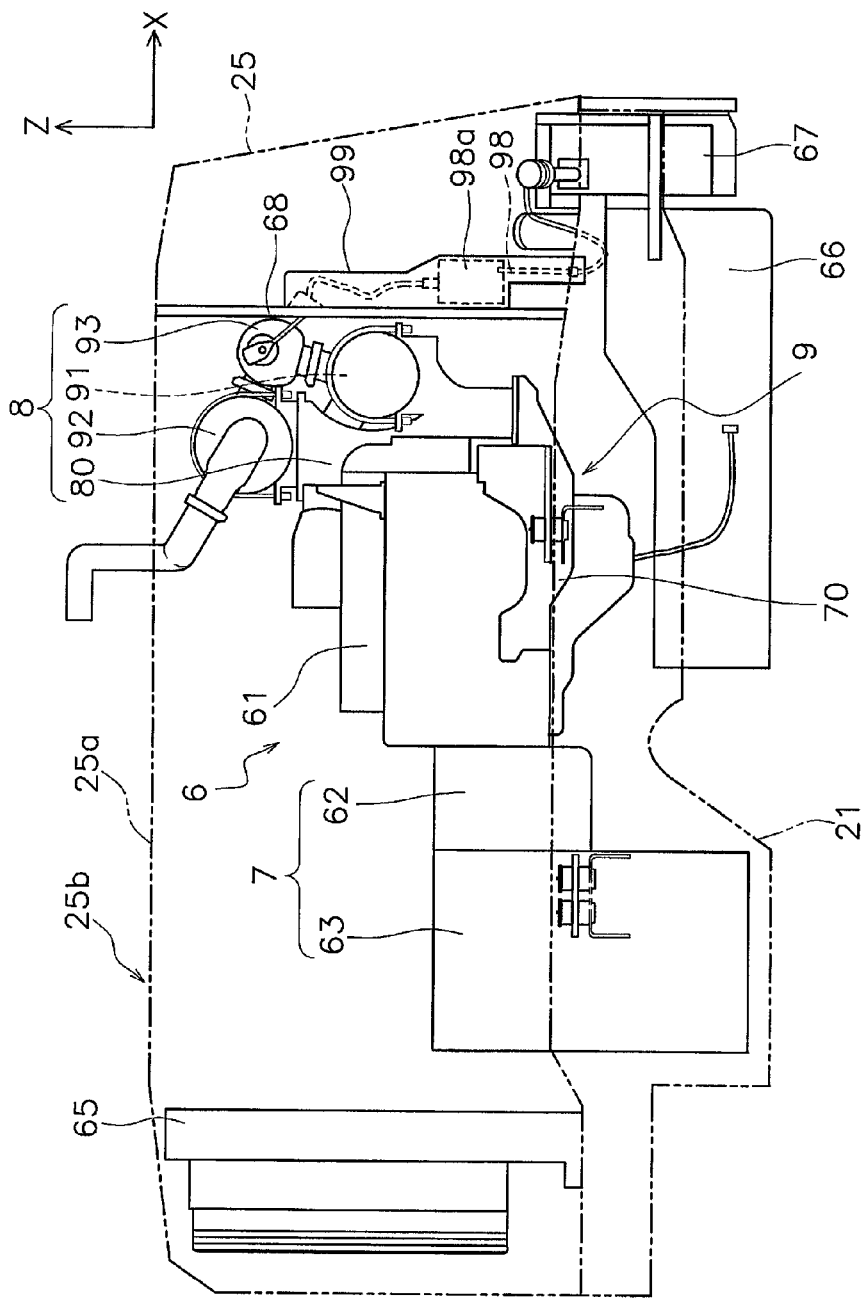
FIG. 9 illustrates a modified example of an embodiment of the present invention.

FIG. 9 is a diagram illustrating a modified example of the embodiment of the present invention. In the modified example, the reducing agent tank 67, the post-treatment unit 8, the engine 61, the torque converter 62, and the transmission 63 are arranged from the front of the vehicle to the rear in order. A work vehicle according to the modified example causes the same effects as in the embodiment of the present invention.

In addition, in the embodiment described above, the first post-treatment apparatus 91 is described as a diesel particulate filter apparatus and the second post-treatment apparatus 92 is described as a selective catalytic reduction apparatus. However, the first post-treatment apparatus 91 may be a selective catalytic reduction apparatus and the second post-treatment apparatus 92 may be a diesel particulate filter apparatus. Here, in this case, since it is preferable that the exhaust from the engine be first fed to the diesel particulate filter apparatus, the order and orientation of the pipes which is connected to the first post-treatment apparatus 91 or the second post-treatment apparatus 92 is reversed.

The upper surface of the outer cover 25 need not be set horizontally. For example, in a case where the highest position of the second post-treatment apparatus 92 is lower than the highest position of the radiator 65, the portion above the radiator 65 in the upper surface of the outer cover 25 may be higher than the portion above the second post-treatment apparatus 92.

The second post-treatment apparatus 92 need not overlap with the engine 61 in top view.

The first mounting component 71 and the second mounting component 72 may be formed integrally rather than as separate parts. Similarly, the lower member 81 and the upper member 87 may be formed integrally rather than as separate parts. Furthermore, the mounting bracket 70 and the post-treatment apparatus support bracket 80 may be formed integrally as the bracket 9.

The number of the dampers 73, 74, and 79*a* to 79*d* is arbitrary. However, it is desirable that the same number of dampers be provided in the left and right directions.

The post-treatment apparatus support bracket 80 need not include either or both of the upper step section 85 and the lower step section 84. However, in such a case, the post-treatment apparatus support bracket 80 includes the lower support sections 86*a* and 86*b* and the upper support sections 88*a* and 88*b* with different heights.

The number of the lower support sections 86*a* and 86*b*, the upper support sections 88*a* and 88*b*, the first fastening components 95*a* and 95*b*, and the second fastening components 96*a* and 96*b* are not limited to two each, and may be one or three or more.

The number and positions of the first connecting section to the seventh connecting section may be appropriately changed. In addition, the post-treatment apparatus support bracket 80 need not include some or all of the first connecting section to the seventh connecting section. The work vehicle 1 need not have some or all of the first cover 100*a*, the second cover 100*b*, and the third cover 100*c*.

The shapes of the first post-treatment apparatus 91 and the second post-treatment apparatus 92 are not limited to a cylindrical shape or the like, and may be another shape such as an elliptical shape or a rectangular shape.

The first post-treatment apparatus 91 and the second post-treatment apparatus 92 may be arranged to be lined up in a different direction from the vehicle width direction. That is, the first post-treatment apparatus 91 and the second post-treatment apparatus 92 may be arranged to be lined up in the vehicle front and back direction.

INDUSTRIAL APPLICABILITY

According to the present invention, it is possible to provide a work vehicle which maintains excellent rear visibility with a function of exhaust treatment.

The invention claimed is:

1. A work vehicle comprising:
a vehicle frame;
a radiator;
an engine provided in front of the radiator;
a first post-treatment apparatus positioned in front of the radiator and configured to treat exhaust from the engine;
a second post-treatment apparatus positioned in front of the radiator and configured to treat exhaust from the engine; and
a bracket positioned in front of the radiator, the bracket being elastically supported by the vehicle frame, and the bracket supporting the engine, the first post-treatment apparatus, and the second post-treatment apparatus,
the vehicle frame including a first support section supporting the bracket and a second support section supporting the radiator, the second support section being lower than the first support section, and
a highest position of the first post-treatment apparatus and a highest position of the second post-treatment apparatus being no higher than a highest position of the radiator.

2. The work vehicle according to claim 1, wherein
at least one of the first post-treatment apparatus and the second post-treatment apparatus is arranged in a position which does not overlap with the engine as seen in a top view thereof.

3. The work vehicle according to claim 1, wherein
the bracket includes:
a mounting bracket supporting the engine and being elastically supported by the vehicle frame; and
a post-treatment apparatus support bracket supported by the mounting bracket at a first edge of the mounting bracket, and the post-treatment apparatus support bracket supporting the first post-treatment apparatus and the second post-treatment apparatus,
the mounting bracket including a damper mounting section between the first edge and a second edge of the mounting bracket.

4. The work vehicle according to claim 3, wherein
the post-treatment apparatus support bracket includes an upper support section and a lower support section, with the upper and lower support sections having different heights as measured from a connecting position to the mounting bracket,
the first post-treatment apparatus is supported by the lower support section, and
the second post-treatment apparatus is supported by the upper support section.

5. The work vehicle according to claim 4, wherein
the second post-treatment apparatus is arranged so as to overlap with a portion of the first post-treatment apparatus as seen in a top view thereof.

6. The work vehicle according to claim 4, further comprising:
- a connecting pipe arranged above the first post-treatment apparatus, the connecting pipe connecting the first post-treatment apparatus and the second post-treatment apparatus,
- the second post-treatment apparatus being adjacent to a side of the connecting pipe.

7. The work vehicle according to claim 4, wherein the upper support section is positioned at a position closer to the engine than the lower support section as seen in a top view thereof.

8. The work vehicle according to claim 7, further comprising:
- an exhaust pipe connected to the second post-treatment apparatus, the exhaust pipe protruding obliquely upward above the engine.

9. The work vehicle according to claim 2, wherein the first post-treatment apparatus is a diesel particulate filter apparatus, the second post-treatment apparatus is a selective catalytic reduction apparatus, and the first post-treatment apparatus is arranged at a position which does not overlap with the engine as seen in the top view thereof.

10. The work vehicle according to claim 1, further comprising:
- an outer cover attached to the vehicle frame, the outer cover being arranged above the engine, the first post-treatment apparatus, the second post-treatment apparatus, and the radiator, the upper surface of the outer cover being disposed horizontally.

11. The work vehicle according to claim 3, wherein the post-treatment apparatus support bracket further includes an anti-sway component connected to the engine, the anti-sway component being configured to reduce vibration of the post-treatment apparatus support bracket along a vehicle front and back direction.

* * * * *